(12) United States Patent
Zhang

(10) Patent No.: US 8,421,958 B2
(45) Date of Patent: Apr. 16, 2013

(54) BACKLIGHT MODULE AND LIQUID CRYSTAL DISPLAY DEVICE

(75) Inventor: Yanxue Zhang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 20 days.

(21) Appl. No.: 13/375,359

(22) PCT Filed: Jun. 20, 2011

(86) PCT No.: PCT/CN2011/075848
§ 371 (c)(1),
(2), (4) Date: Nov. 30, 2011

(87) PCT Pub. No.: WO2012/151774
PCT Pub. Date: Nov. 15, 2012

(65) Prior Publication Data
US 2012/0287376 A1  Nov. 15, 2012

(30) Foreign Application Priority Data
May 10, 2011 (CN) .......................... 2011 1 0120961

(51) Int. Cl.
*G02F 1/13357* (2006.01)

(52) U.S. Cl.
USPC .................... 349/64; 349/58; 362/97.3

(58) Field of Classification Search .................. None
See application file for complete search history.

(56) References Cited

U.S. PATENT DOCUMENTS

| 7,036,956 B1 * | 5/2006 | Chou ............................ 362/246 |
| 7,264,364 B2 * | 9/2007 | Chen et al. ....................... 362/29 |
| 7,334,927 B2 * | 2/2008 | Lai et al. ........................ 362/558 |
| 7,382,423 B2 * | 6/2008 | Chang et al. ...................... 349/64 |
| 2002/0044437 A1 * | 4/2002 | Lee ................................. 362/31 |
| 2009/0147173 A1 * | 6/2009 | An et al. .......................... 349/58 |
| 2009/0154139 A1 * | 6/2009 | Shin ............................. 362/97.1 |
| 2010/0328966 A1 * | 12/2010 | Shin ............................... 362/609 |
| 2011/0310326 A1 * | 12/2011 | Kitada ............................. 349/61 |
| 2012/0044668 A1 * | 2/2012 | Takeuchi ....................... 362/97.1 |
| 2012/0063133 A1 * | 3/2012 | Takeuchi et al. ............... 362/235 |
| 2012/0081634 A1 * | 4/2012 | Yokota ............................. 349/62 |

FOREIGN PATENT DOCUMENTS

WO  WO 2010/126031 A1 * 11/2010
WO  WO 2010/146914 A1 * 12/2010

OTHER PUBLICATIONS

International Search Report for PCT/CN2011/075848, mailed Mar. 1, 2012.*

* cited by examiner

*Primary Examiner* — Mike Stahl
(74) *Attorney, Agent, or Firm* — Cheng-Ju Chiang

(57) ABSTRACT

A backlight module is disclosed in the present disclosure. The backlight module comprises a reflective sheet, a printed circuit board (PCB), a diffuser plate and a supporting structure. The reflective sheet is attached onto the PCB, and the supporting structure is located between the diffuser plate and the reflective sheet. The supporting structure comprises a body portion and a supporting portion, and the PCB comprises an adapter member. By using the adapter member and the supporting structure in the backlight module of the present disclosure, the supporting structure can make contact with the PCB in a large area and support the diffuser plate stably. Further, a liquid crystal display (LCD) device using the backlight module described above is also disclosed in the present disclosure.

20 Claims, 3 Drawing Sheets

BACKLIGHT MODULE AND LIQUID CRYSTAL DISPLAY DEVICE

FIELD OF THE INVENTION

The present disclosure generally relates to the technical field of flat panel display devices, and more particularly, to a backlight module and a liquid crystal display (LCD) device using the backlight module.

BACKGROUND OF THE INVENTION

In conventional backlight modules of liquid crystal display (LCD) devices, printed circuit boards (PCBs) are fixed by screws, and supporting posts are used to abut against reflective sheets and support diffuser plates. However, assembling a backlight module in this way requires a large number of screws and consumes much labor and metal materials; furthermore, because of the small areas of the screws and the supporting posts, the stressed surface areas are also small, which tends to cause protruding or warping of the PCB.

In backlight modules of prior art, the screws and the supporting posts may cause protruding or warping of the reflective sheet and the PCB, which tends to cause deformation of the backplate of the backlight module due to a non-uniform force distribution. Moreover, in the conventional backlight modules, an end of each supporting post protrudes out of the backplate, which is unfavorable for achieving an aesthetic appearance.

SUMMARY OF THE INVENTION

A primary objective of the present disclosure is to provide a backlight module and a liquid crystal display (LCD) device which can solve the problem with the conventional backlight modules that the screws and the supporting posts tend to cause deformation of the PCBs and the reflective sheets. According to the backlight module and the LCD device of the present disclosure, the PCB and the reflective sheet of the backlight module can be effectively protected from deformation and, meanwhile, the diffuser plate can be supported.

To achieve this objective, the present disclosure provides a backlight module, comprising a reflective sheet, a printed circuit board (PCB), a diffuser plate and a supporting structure. The reflective sheet is attached onto the PCB, and the supporting structure is located between the diffuser plate and the reflective sheet. The supporting structure comprises a body portion and a supporting portion, and the PCB comprises an adapter member. An end of the body portion abuts against the diffuser plate, the other end of the body portion is provided with a plurality of fixing pins and is snap-fitted with the adapter member, and the supporting portion is provided with a plurality of assembling pins penetrating through the reflective sheet.

As a further improvement of the backlight module, the supporting portion is fitted over the body portion.

As a further improvement of the backlight module, the backlight module further comprises a fixing hole for receiving the adapter member.

As a further improvement of the backlight module, the adapter member comprises a plurality of guiding grooves having a guiding direction parallel with an axis of the fixing hole, the number of the guiding grooves corresponds to the number of the fixing pins, the guiding grooves mate with the fixing pins respectively, and the adapter member is adapted to receive the fixing pins.

As a further improvement of the backlight module, the adapter member further comprises a plurality of snap-fitting holes each having an opening direction orthogonal to the guiding direction of the guiding grooves, the fixing pins comprise a plurality of snap-fitting elements to be snap-fitted with the snap-fitting holes, and the number of the snap-fitting holes corresponds to the number of the snap-fitting elements.

As a further improvement of the backlight module, the backlight module further comprises a backplate, wherein the fixing hole extends through the reflective sheet, the PCB and the backplate, and the adapter member penetrates through the reflective sheet, the PCB and the backplate.

As a further improvement of the backlight module, the supporting portion further comprises a cap-shaped base abutting against the reflective sheet, and the plurality of assembling pins penetrate through the reflective sheet and the PCB to abut against the backplate.

As a further improvement of the backlight module, the adapter member further comprises a base plate having a first bottom surface, and the backplate has a second bottom surface flush with the first bottom surface.

To achieve the aforesaid objective, the present disclosure provides also a backlight module, comprising a reflective sheet, a PCB, a diffuser plate and a supporting structure. The reflective sheet is attached onto the PCB, and the supporting structure is located between the diffuser plate and the reflective sheet. The PCB comprises an adapter member. An end of the supporting structure abuts against the diffuser plate, the other end of the supporting structure abuts against the reflective sheet, and a middle portion of the supporting structure is snap-fitted with the adapter member.

As a further improvement of the backlight module, the supporting structure further comprises a rod-shaped body and a round-table structure fixed to each other, an end of the rod-shaped body abuts against the diffuser plate and the other end of the rod-shaped body is snap-fitted with the adapter member, and the round-table structure abuts against the reflective sheet.

To achieve the aforesaid objective, the present disclosure further provides a liquid crystal display (LCD) device, comprising a liquid crystal panel and a backlight module. The backlight module comprises a reflective sheet, a PCB, a diffuser plate and a supporting structure. The liquid crystal panel is attached onto the backlight module, the reflective sheet is attached onto the PCB, and the supporting structure is located between the diffuser plate and the reflective sheet. The supporting structure comprises a body portion and a supporting portion, and the PCB comprises an adapter member. An end of the body portion abuts against the diffuser plate, the other end of the body portion is provided with a plurality of fixing pins and is snap-fitted with the adapter member, and the supporting portion is provided with a plurality of assembling pins penetrating through the reflective sheet.

As a further improvement of the LCD, the supporting portion is fitted over the body portion.

As a further improvement of the LCD, the backlight module further comprises a fixing hole for receiving the adapter member.

As a further improvement of the LCD, the adapter member comprises a plurality of guiding grooves having a guiding direction parallel with an axis of the fixing hole, the number of the guiding grooves corresponds to the number of the fixing pins, the guiding grooves mate with the fixing pins respectively, and the adapter member is adapted to receive the fixing pins.

As a further improvement of the LCD, the adapter member further comprises a plurality of snap-fitting holes each having an opening direction orthogonal to the guiding direction of the guiding grooves, the fixing pins comprise a plurality of snap-fitting elements to be snap-fitted with the snap-fitting holes, and the number of the snap-fitting holes corresponds to the number of the snap-fitting elements.

As a further improvement of the LCD, the backlight module further comprises a backplate, the fixing hole penetrates through the reflective sheet, the PCB and the backplate, and the adapter member extends through the reflective sheet, the PCB and the backplate.

As a further improvement of the LCD, the supporting portion further comprises a cap-shaped base abutting against the reflective sheet, and the plurality of assembling pins penetrate through the reflective sheet and the PCB to abut against the backplate.

As a further improvement of the LCD, the adapter member further comprises a base plate having a first bottom surface, and the backplate has a second bottom surface flush with the first bottom surface.

As a further improvement of the LCD, the snap-fitting holes are disposed in tracks of the guiding grooves.

As a further improvement of the LCD, the fixing pins and the assembling pins are located at a same side of the base.

The present disclosure has the following benefits: by using an adapter member and a supporting structure in the backlight module and by disposing a plurality of fixing pins abutting against the adapter member and a plurality of assembling pins in the supporting structure, the supporting structure can make contact with the reflective sheet in a large area and the assembling pins can abut against the backplate to stably support the diffuser plate.

In the supporting structure of the backlight module of the present disclosure, the base of a cap-shaped form is used to abut against the reflective sheet, and the plurality of assembling pins are used together to abut against the backplate; meanwhile, the adapter member is used to fix the fixing pins. Thereby, the force applied on the reflective sheet, the PCB and the backplate can be uniformly distributed to prevent deformation of the PCB and the backplate due to non-uniform distribution of the force. Moreover, because the first bottom surface of the adapter member is flush with the second bottom surface of the backplate, the second bottom surface of the backplate can be kept flat and aesthetic.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
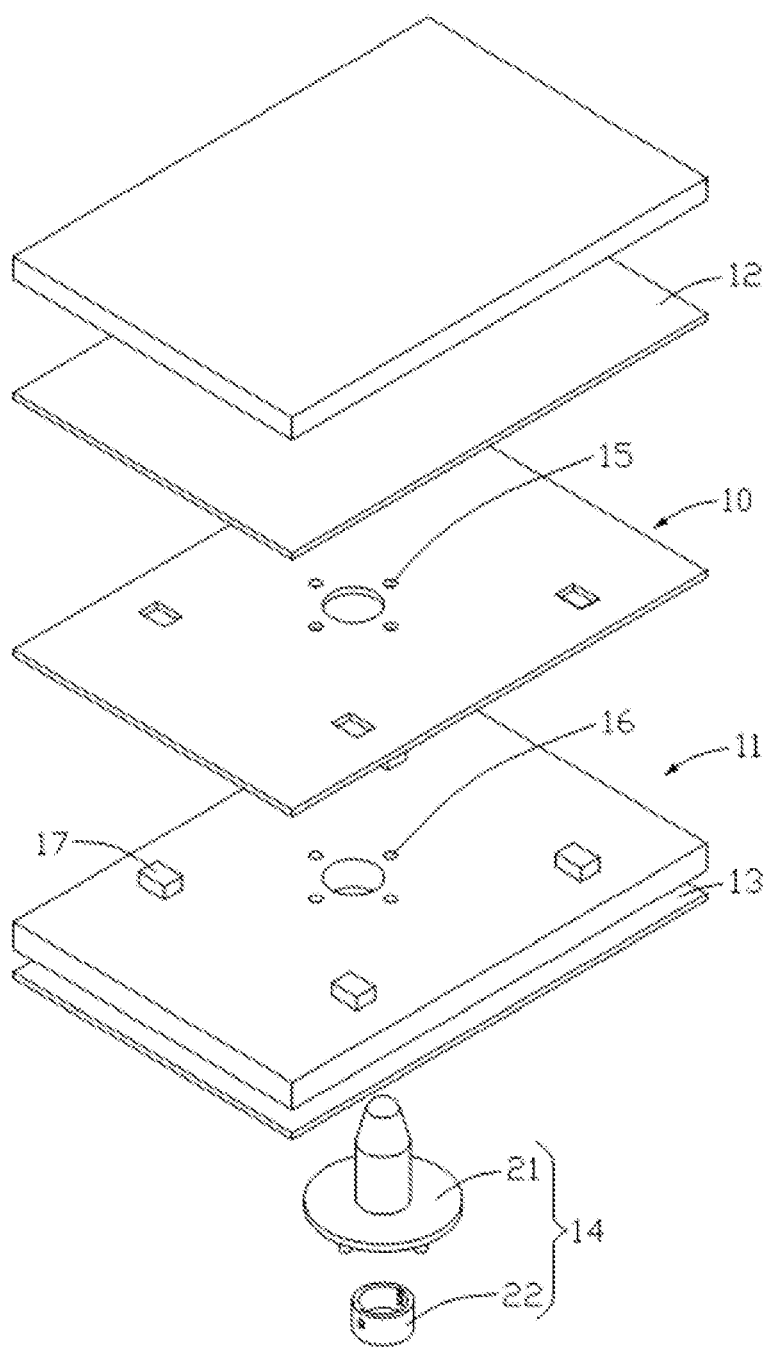
FIG. 1 is a schematic perspective view of a preferred embodiment of a backlight module according to the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
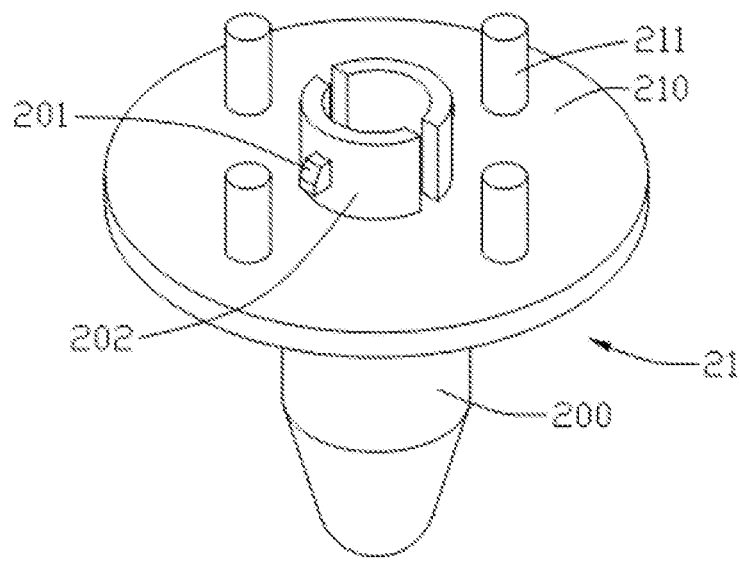
FIG. 2 is a schematic enlarged view of a supporting structure of the backlight module shown in FIG. 1 in an upside-down state.
Figure 3:
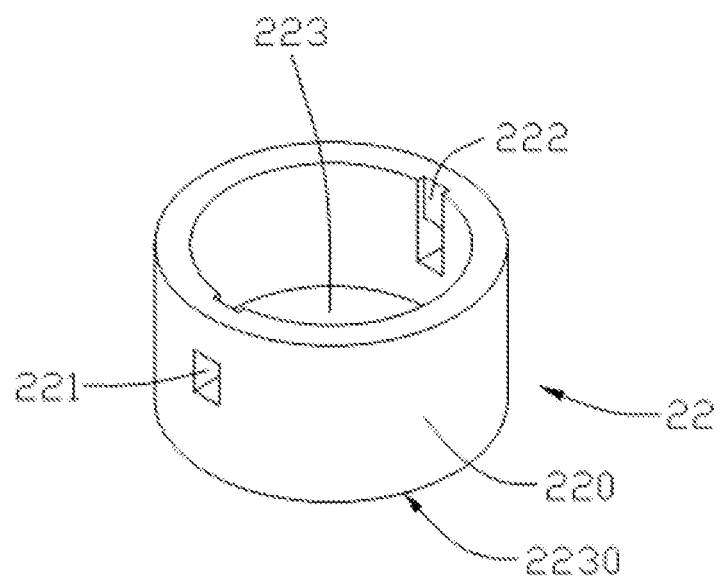
FIG. 3 is a schematic enlarged view of an adapter member of the backlight module shown in FIG. 1.

Referring to FIG. 1 to FIG. 3 together, FIG. 1 is a schematic perspective view of a preferred embodiment of a backlight module according to the present disclosure, FIG. 2 is a schematic enlarged view of a supporting structure of the backlight module shown in FIG. 1 in an upside-down state, and FIG. 3 is a schematic enlarged view of an adapter member of the backlight module shown in FIG. 1.

The backlight module (not labeled) of this embodiment comprises a reflective sheet 10, a printed circuit board (PCB) 11, a diffuser plate 12, a backplate 13, a supporting structure 21 and a plurality of light emitting diodes (LEDs) 17.

The reflective sheet 10 is attached onto the PCB 11, the PCB 11 is disposed between the reflective sheet 10 and the backplate 13, and the backplate 13 is attached onto the PCB 11 at a side opposite to the reflective sheet 10.

The backlight module further comprises a through-hole penetrating through the reflective sheet 10, the PCB 11 and the backplate 13 for fixing the supporting structure 21 in this embodiment. Hereinbelow, for ease of understanding, this through-hole is termed as a fixing hole in terms of its function. The reflective sheet 10 comprises four upper assembling holes 15, and the PCB 11 comprises four lower assembling holes 16. The four upper assembling holes 15 and the four lower assembling holes 16 are disposed corresponding to each other to form four through-holes for assembling purpose. Hereinbelow, for ease of understanding, the four through-holes are termed as four assembling holes in terms of their functions. The four assembling holes are uniformly distributed around the fixing hole.

The PCB 11 further comprises an adapter member 22 to be received in the fixing hole. The adapter member 22 penetrates through the reflective sheet 10, the PCB 11 and the backplate 13. The supporting structure 21 and the adapter member 22 form a support 14 together.

The adapter member 22 comprises a sidewall 220, a plurality of snap-fitting holes 221, a plurality of guiding grooves 222 and a base plate 223. The sidewall 220 is of a cylindrical form, and a blind hole (not labeled) is formed by the sidewall 220 and the base plate 223 together. The plurality of guiding grooves 222 are formed on the sidewall 220 inside the blind hole, and the plurality of snap-fitting holes 221 are disposed in tracks of the guiding grooves 222. The plurality of guiding grooves 222 have a guiding direction (the guiding direction refers to an opening direction of the tracks) parallel to an axis of the fixing hole. An opening direction of each of the snap-fitting holes 221 is orthogonal to the guiding direction of the guiding grooves 222, and the snap-fitting holes 221 are corresponding to the guiding grooves 222 one by one.

The supporting structure 21, which is disposed between the diffuser plate 12 and the reflective sheet 10, comprises a body portion 200 and a supporting portion 210. The supporting portion 210 is fitted over and formed integrally with the body portion 200.

The body portion 200 comprises a bar-shaped end (not labeled), a plurality of snap-fitting elements 201 and a plurality of fixing pins 202. The bar-shaped end is located at one side of the supporting portion 210, and the snap-fitting elements 201 and the plurality of fixing pins 202 are located at the other side of the supporting portion 210. The plurality of fixing pins 202 are extensions of the bar-shaped end, and the snap-fitting elements 201 are disposed on cambered surfaces of the fixing pins 202. In this embodiment, the bar-shaped end is of a cylindrical form and an end of the bar-shaped end that abuts against the diffuser plate 12 is a cambered surface. The cambered surface is adapted to buffer collisions and squeezing forces from the diffuser plate 12, which is favorable for maintaining the flatness of the diffuser plate 12.

The supporting portion 210 comprises a base (not labeled) and four assembling pins 211 extending from the base. The base is of a cap-shaped structure, and abuts against the reflective sheet 10 when being assembled. In the embodiment of the present disclosure, the four assembling holes receive the four assembling pins 211 respectively, and the four assembling pins 211 penetrate through the reflective sheet 10 and the PCB 11 to abut against the backplate 13.

In a preferred embodiment of the present disclosure, the body portion 200 is rod-shaped, and an end of the body portion 200 that abuts against the diffuser plate 12 is of a dome structure, which is favorable for buffering the force applied thereon. The base of the supporting portion 210 is cap-shaped, which can also be a disk-shaped, together with the assembling pins 211 to form a round-table structure; i.e., the assembling pins 211 act as legs of the round-table structure. Of course, as will be appreciated by those skilled in the art, this may also be slightly modified depending on practical needs.

In this embodiment, the fixing pins 202 and the four assembling pins 211 are located at a same side of the base.

The LEDs 17 are disposed on the PCB 11 and penetrate through the reflective sheet 10. The LEDs 17 are electrically connected to the PCB 11.

Figure 4:
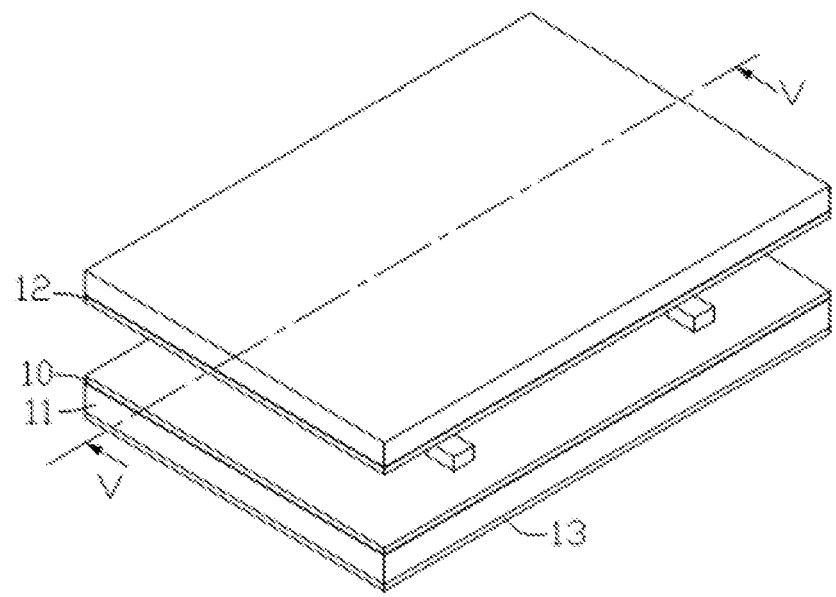
FIG. 4 is a schematic structural view of the assembled backlight module shown in FIG. 1.
Figure 5:
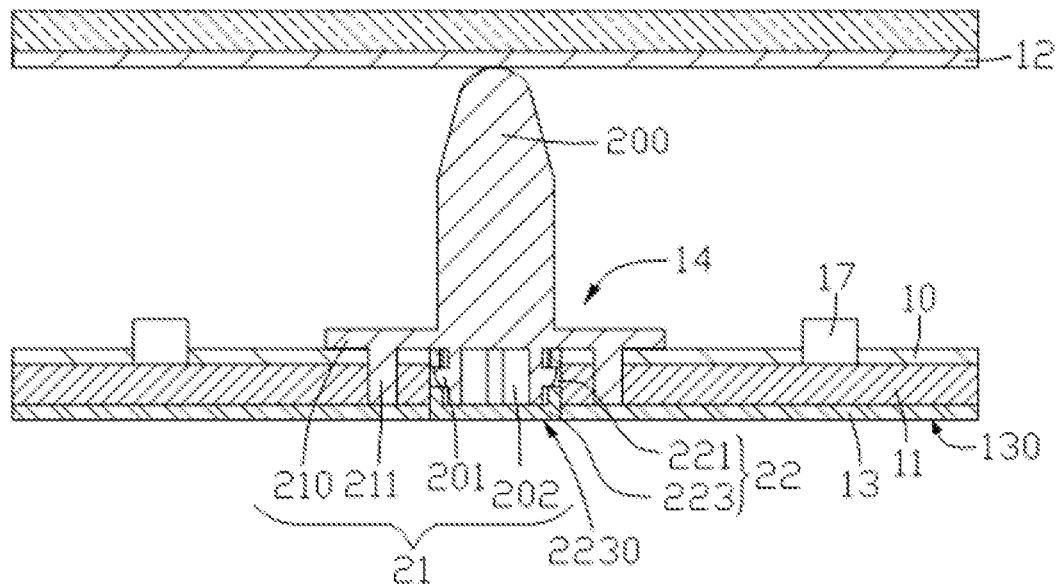
FIG. 5 is a schematic partial cross-sectional view of the backlight module of FIG. 4 taken along a line V-V.

Referring to FIG. 4 and FIG. 5, FIG. 4 is a schematic structural view of the assembled backlight module shown in FIG. 1, and FIG. 5 is a schematic partial cross-sectional view of the backlight module of FIG. 4 taken along a line V-V.

Firstly, the reflective sheet 10 is attached onto the PCB 11 in such a way that the four upper assembling holes 15 of the reflective sheet 10 are aligned with the four lower assembling holes 16 of the PCB 11 to form the four assembling holes, and the PCB 11 with the reflective sheet 10 attached thereon is attached onto the backplate 13. As described above, the fixing hole penetrates through the reflective sheet 10, the PCB 11 and the backplate 13.

Then, the adapter member 22 is pressed into and completely received in the fixing hole, and the base plate 223 is parallel with the backplate 13. Further, the base plate 223 comprises a first bottom surface 2230 formed by an outer surface of the base plate 223, and the backplate 13 comprises a second bottom surface 130. The first bottom surface 2230 is disposed flush with the second bottom surface 130 so that the base plate 223 lies in the same plane as the backplate 13.

The four assembling pins 211 of the supporting structure 21 are aligned with the four assembling holes and the fixing pins 202 are aligned with the fixing hole. Then, the adapter member 22 is rotated to have the fixing pins 202 further aligned with the guiding grooves 222.

Next, the four assembling pins 211 are pressed into the four assembling holes, and correspondingly, the fixing pins 202 are pressed into the fixing hole. Further, the fixing pins 202 are pressed into the guiding grooves 222. And the fixing pins 202 are mated with the guiding grooves 222 and are received in the blind hole of the adapter member 22.

During the pressing process described above, the snap-fitting elements 201 of the fixing pins 202 are deformed under pressure so that, when the fixing pins 202 are pressed to a specified position, the snap-fitting elements 201 are snap-fitted into the snap-fitting holes 221. And an end surface of each of the fixing pins 202 abuts against the base plate 223. In this way, the supporting structure 21 is fixed in the fixing hole.

Next, the diffuser plate 12 is disposed to abut on the cambered end surface of the bar-shaped end of the supporting structure 21.

In this embodiment of the present disclosure, the number of the assembling holes is four; however, the number of the assembling holes is not particularly limited, and there may also be two, three, or five or more assembling holes distributed uniformly around the fixing hole. Correspondingly, the number of the assembling pins 211, which corresponds to that of the assembling holes, is not particularly limited. Likewise, the number of the fixing pins 202 is not particularly limited, and may be two or more; for example, when the number of the fixing pins 202 is two, the two fixing pins 202 may be formed by cutting a hollow cylinder in such a way that the two fixing pins 202 are axisymmetric with each other. Additionally, the snap-fitting elements 201 are disposed on exterior surfaces of the fixing pins 202, a number of the snap-fitting elements 201 corresponds to that of the snap-fitting holes 221.

Through the assembling process described above, a backlight module of the present disclosure is formed. In the supporting structure 21 of the backlight module of the present disclosure, the base of a cap-shaped form is used to abut against the reflective sheet 10, and a plurality of assembling pins 211 are used together to abut against the backplate 13; meanwhile, the adapter member 22 is used to fix the fixing pins 202. Thereby, the force applied on the reflective sheet 10, the PCB 11 and the backplate 13 can be uniformly distributed to prevent deformation of the PCB 11 due to non-uniform distribution of the force. Moreover, because the adapter member 22 is completely received into the fixing hole with the first bottom surface 2230 of the adapter member 22 being flush with the second bottom surface 130 of the backplate 13, the backplate 13 of the backlight module can be kept flat and aesthetic.

The present disclosure also provides a liquid crystal display (LCD) device, which comprises a liquid crystal panel and the backlight module described above. The liquid crystal panel is attached onto the diffuser plate 12 at a side opposite to the supporting structure 12.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A backlight module, comprising a reflective sheet, a printed circuit board (PCB), a diffuser plate and a supporting structure, wherein the reflective sheet is attached onto the PCB, the supporting structure is located between the diffuser plate and the reflective sheet, the supporting structure comprises a body portion and a supporting portion, the PCB comprises an adapter member, an end of the body portion abuts against the diffuser plate, the other end of the body portion is provided with a plurality of fixing pins which are snap-fitted with the adapter member, and the supporting portion is provided with a plurality of assembling pins penetrating through the reflective sheet.

2. The backlight module of claim 1, wherein the supporting portion is fitted over the body portion.

3. The backlight module of claim 1, further comprising a fixing hole for receiving the adapter member.

4. The backlight module of claim 3, wherein the adapter member comprises a plurality of guiding grooves having a guiding direction parallel with an axis of the fixing hole, the number of the guiding grooves corresponds to the number of the fixing pins, the guiding grooves mate with the fixing pins respectively, and the adapter member is adapted to receive the fixing pins.

5. The backlight module of claim 4, wherein the adapter member further comprises a plurality of snap-fitting holes each having an opening direction orthogonal to the guiding direction of the guiding grooves, the fixing pins comprise a plurality of snap-fitting elements to be snap-fitted with the snap-fitting holes, and the number of the snap-fitting holes corresponds to the number of the snap-fitting elements.

6. The backlight module of claim 3, further comprising a backplate, wherein the fixing hole penetrates through the reflective sheet, the PCB and the backplate, and the adapter member penetrates through the reflective sheet, the PCB and the backplate.

7. The backlight module of claim 6, wherein the supporting portion further comprises a cap-shaped base abutting against the reflective sheet, and the plurality of assembling pins penetrate through the reflective sheet and the PCB to abut against the backplate.

8. The backlight module of claim 6, wherein the adapter member further comprises a base plate having a first bottom surface, and the backplate has a second bottom surface flush with the first bottom surface.

9. A backlight module, comprising a reflective sheet, a printed circuit board (PCB), a diffuser plate and a supporting structure, wherein the reflective sheet is attached onto the PCB, the supporting structure is located between the diffuser plate and the reflective sheet, the PCB comprises an adapter member, an end of the supporting structure abuts against the diffuser plate, the other end of the supporting structure abuts against the reflective sheet, and a middle portion of the supporting structure is snap-fitted with the adapter member.

10. The backlight module of claim 9, wherein the supporting structure further comprises a rod-shaped body and a round-table structure fixed to each other, an end of the rod-shaped body abuts against the diffuser plate and the other end of the rod-shaped body is snap-fitted with the adapter member, and the round-table structure abuts against the reflective sheet.

11. A liquid crystal display (LCD) device, comprising a liquid crystal panel and a backlight module, wherein the backlight module comprises a reflective sheet, a printed circuit board (PCB), a diffuser plate and a supporting structure, the liquid crystal panel is attached onto the backlight module, the reflective sheet is attached onto the PCB, the supporting structure is located between the diffuser plate and the reflective sheet, the supporting structure comprises a body portion and a supporting portion, the PCB comprises an adapter member, an end of the body portion abuts against the diffuser plate, the other end of the body portion is provided with a plurality of fixing pins which are snap-fitted with the adapter member, and the supporting portion is provided with a plurality of assembling pins penetrating through the reflective sheet.

12. The LCD device of claim 11, wherein the supporting portion is fitted over the body portion.

13. The LCD device of claim 11, wherein the backlight module further comprises a fixing hole for receiving the adapter member.

14. The LCD device of claim 13, wherein the adapter member comprises a plurality of guiding grooves having a guiding direction parallel with an axis of the fixing hole, the number of the guiding grooves corresponds to the number of the fixing pins, the guiding grooves mate with the fixing pins respectively, and the adapter member is adapted to receive the fixing pins.

15. The LCD device of claim 14, wherein the adapter member further comprises a plurality of snap-fitting holes each having an opening direction orthogonal to the guiding direction of the guiding grooves, the fixing pins comprise a plurality of snap-fitting elements to be snap-fitted with the snap-fitting holes, and the number of the snap-fitting holes corresponds to the number of the snap-fitting elements.

16. The LCD device of claim 13, wherein the backlight module further comprises a backplate, the fixing hole penetrates through the reflective sheet, the PCB and the backplate, and the adapter member extends through the reflective sheet, the PCB and the backplate.

17. The LCD device of claim 16, wherein the supporting portion further comprises a cap-shaped base abutting against the reflective sheet, and the plurality of assembling pins penetrate through the reflective sheet and the PCB to abut against the backplate.

18. The LCD device of claim 16, wherein the adapter member further comprises a base plate having a first bottom surface, and the backplate has a second bottom surface flush with the first bottom surface.

19. The LCD device of claim 15, wherein the snap-fitting holes are disposed in tracks of the guiding grooves.

20. The LCD device of claim 17, wherein the fixing pins and the assembling pins are located at a same side of the base.

* * * * *